United States Patent [19]

Burford

[11] Patent Number: 4,715,315

[45] Date of Patent: * Dec. 29, 1987

[54] DISPENSER FOR PARTICULATE MATERIAL

[75] Inventor: Charles E. Burford, Dallas, Tex.

[73] Assignee: Burford Corp., Maysville, Okla.

[*] Notice: The portion of the term of this patent subsequent to Sep. 16, 2003 has been disclaimed.

[21] Appl. No.: 795,982

[22] Filed: Nov. 7, 1985

Related U.S. Application Data

[63] Continuation-in-part of Ser. No. 480,027, Mar. 27, 1983, Pat. No. 4,611,555.

[51] Int. Cl.$^4$ .............................................. B05C 11/00
[52] U.S. Cl. ........................................ 118/684; 49/254; 99/494; 118/25; 220/326; 220/331; 222/274; 222/368
[58] Field of Search .............. 222/367, 368, 233, 236, 222/238, 273, 274, 268, 410; 221/260, 266; 118/25, 668, 675, 676, 679, 682–684; 220/326, 329, 331, 345; 292/163; 99/494; 49/254

[56] References Cited

U.S. PATENT DOCUMENTS

| | | | |
|---|---|---|---|
| 953,436 | 3/1910 | Renneburg | 222/359 |
| 1,455,133 | 5/1923 | Downs | 220/326 |
| 2,475,381 | 7/1949 | Erickson | 222/368 |
| 2,569,421 | 9/1951 | Larson | 222/274 X |
| 2,579,514 | 12/1951 | Rhodes | 118/679 |
| 2,605,935 | 8/1952 | Huitema | 222/615 |
| 2,679,950 | 6/1954 | Swanson | 222/368 X |
| 2,680,547 | 6/1954 | Donath | 222/164 X |
| 2,855,891 | 10/1958 | Schmied | 118/684 |
| 2,995,107 | 8/1961 | Archer | 118/25 X |
| 3,070,263 | 12/1962 | McMullen | 222/368 X |
| 3,163,333 | 12/1964 | Lindaberry | 222/268 |
| 3,166,222 | 1/1965 | Schrader | 222/196 X |
| 3,362,581 | 1/1968 | Cordes | 222/274 X |
| 3,391,831 | 7/1968 | Wolf | 222/368 X |
| 3,528,386 | 9/1970 | Morine | 118/25 X |
| 3,606,965 | 9/1971 | Cortelyou | 222/368 X |
| 3,767,089 | 10/1973 | McKee | 222/221 |
| 3,768,203 | 10/1973 | Bellucci | 220/331 X |
| 4,162,751 | 7/1979 | Hetland et al. | 222/368 X |
| 4,264,023 | 4/1981 | Stocks | 222/368 X |
| 4,511,067 | 4/1985 | Martin et al. | 222/368 X |
| 4,566,506 | 1/1986 | Cramer | 118/25 X |
| 4,611,555 | 9/1986 | Burford | 222/368 X |

FOREIGN PATENT DOCUMENTS

| | | | |
|---|---|---|---|
| 170520 | 8/1951 | Austria | 222/274 |
| 2087356 | 5/1982 | United Kingdom . | |

Primary Examiner—Joseph J. Rolla
Assistant Examiner—Kevin P. Shaver
Attorney, Agent, or Firm—Crutsinger & Booth

[57] ABSTRACT

Apparatus for intermittently dispensing either fragile particulate material, such as sesame seeds, or flaky material, such as bran, through openings in a tube to spread material over an array of spaced rows and columns of a food product in a pan. The dispensing apparatus comprises a hopper from which fragile particulate material is dispensed through a dispensing tube in which a mandrel driven by a reversible variable speed motor is rotatably disposed. The mandrel has spaced spline teeth formed on its outer surface in dispensing sections separated by blocking collars spaced longitudinally of the mandrel such that rotation of the mandrel causes particulate material to be dispensed in parallel columns and such that intermittent rotation of the mandrel causes the columns to be divided to form rows. An outlet passage in the dispensing tube is shaped and positioned to expedite dispensing granular material when the mandrel is rotated in one direction and to dispense flaky material when the mandrel is rotated in the opposite direction. A dispensing chute is formed adjacent the outlet passage to spread material dispensed uniformly over the surface of a food product.

7 Claims, 3 Drawing Figures

DISPENSER FOR PARTICULATE MATERIAL

CROSS-REFERENCE TO RELATED APPLICATIONS

This application is a continuation-in-part of my co-pending application Ser. No. 06/480,027 filed Mar. 27, 1983, entitled "Spreader For Particulate Material" now U.S. Pat. No. 4,611,555 which issued Sept. 16, 1986.

BACKGROUND OF INVENTION

Apparatus heretofore devised to dispense granular material onto the surface of bakery products has not been particularly suitable for dispensing flaky non-granular material such as bran. Dispensers for granular material, such as sesame seeds onto the upper surface of bakery products, have not accurately dispensed controlled quantities of either granular particulate material or flaky material. Such devices have generally comprised horizontally disposed screens or discs having openings formed therein adjacent the bottom of a hopper.

SUMMARY OF INVENTION

The apparatus disclosed herein is particularly adapted to expedite dispensing either granular or flaky material without extensive modification of the apparatus. The dispenser includes a hopper or container having an elongated opening formed in the lower end thereof communicating with an inlet passage formed through the wall of a hollow dispensing tube which extends transversely above a conveyor. A mandrel is rotatably disposed in the hollow bore through the dispensing tube and divides the bore of the tube into spaced dispensing sections separated by blocking sections. The outer surface of the mandrel has spline teeth formed thereon in the dispensing sections. The major diameter of the spline teeth is less than the inside diameter of the tube by a distance at least equal to the diameter of particles of material being dispensed to prevent grinding or milling of particles. The major diameter of the spline teeth, while less than the diameter of the bore through the dispensing tube, is sufficiently great to prevent unobstructed gravity flow of particles of material through the annular space between the mandrel and the wall of the tube in the dispensing sections.

An outlet passage in the dispensing tube is shaped and positioned to accurately dispense granular material when the mandrel is rotated in one direction and to dispense flaky material when the mandrel is rotated in the opposite direction. A deflector chute is positioned adjacent the outlet passage to spread or disperse clumps of material flowing through the outlet passage to spread the material uniformly over the surface of a food product.

The dispensing apparatus is devised to permit installation of different mandrels in the dispensing tube for dispensing different materials and for adjusting the number of dispensing sections through which particulate material is to be dispensed. A clutch drivingly connected between a reversible motor and the mandrel is energized by a switch upon arrival of an article which is to receive particulate material and is disengaged upon departure of the article.

DESCRIPTION OF DRAWING

Drawings of a preferred embodiment of the invention are annexed hereto so that the invention may be better and more fully understood, and which.

Numeral references are employed to designate like parts throughout the various figures of the drawings.

DESCRIPTION OF A PREFERRED EMBODIMENT

Figure 1:
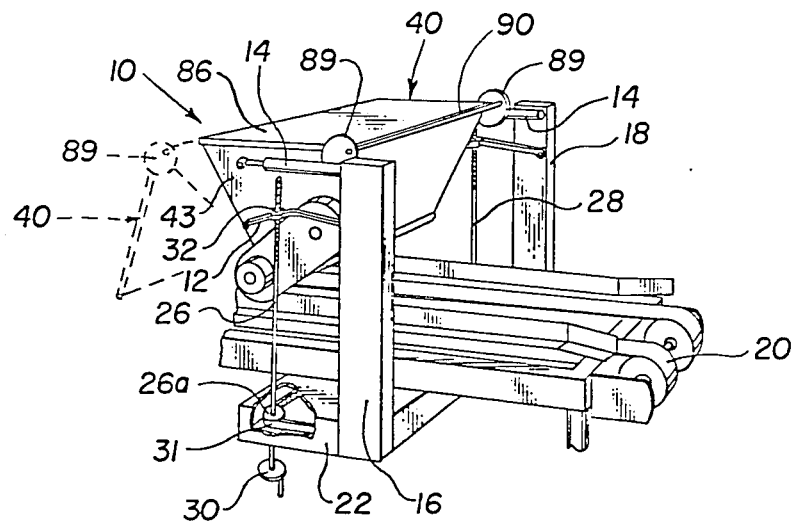
FIG. 1 is a perspective view of a spreader for particulate or flaky material associated with a conveyor.
Figure 3:
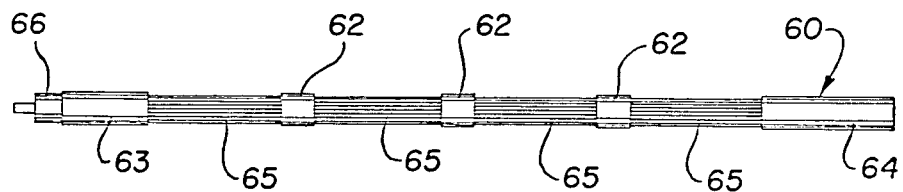
FIG. 3 is an elevational view of the mandrel.
Figure 2:
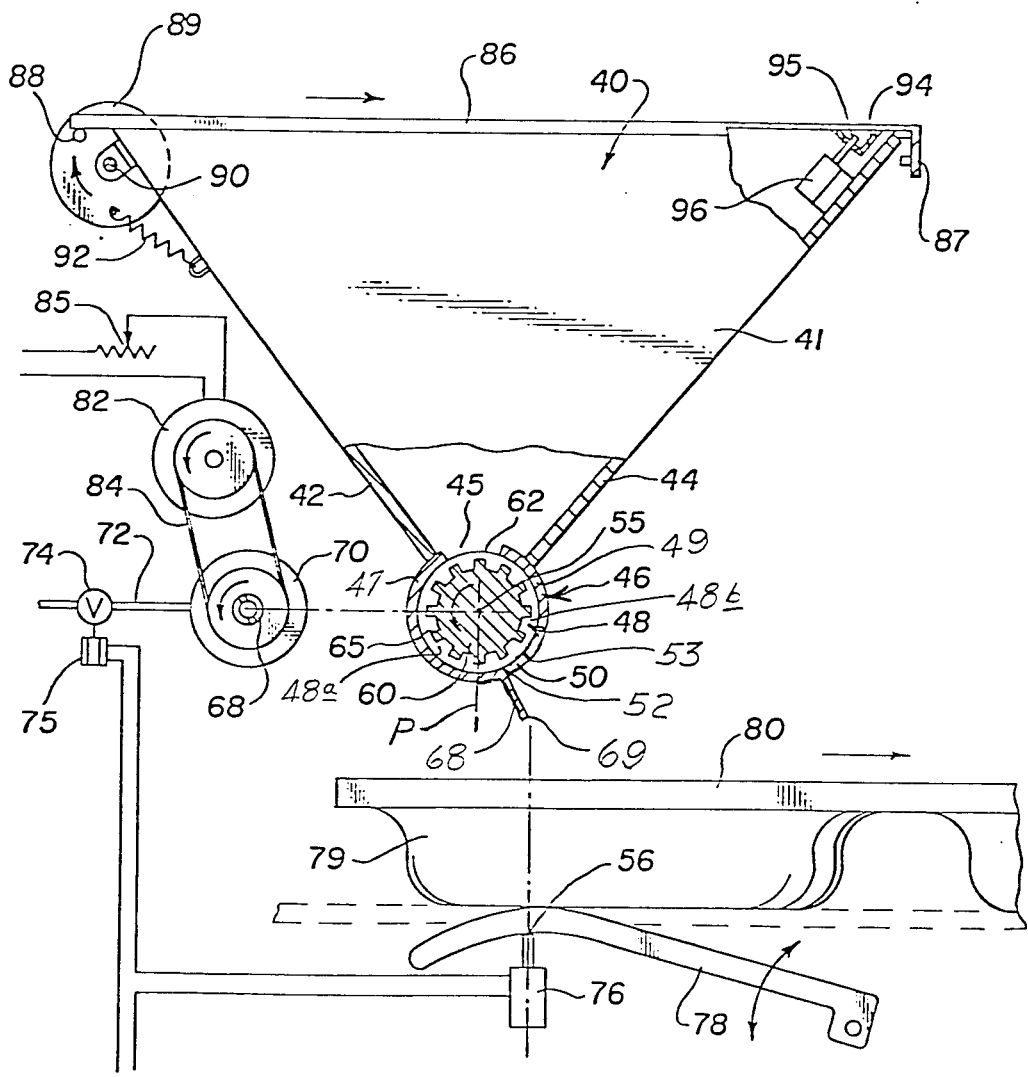
FIG. 2 is a diagrammatic illustration of the spreader and the controlled system associated therewith.

A preferred embodiment of the spreader for particulate material is illustrated in FIGS. 1-3 of the drawing.

Referring to FIG. 1 of the drawing, the numeral 10 generally designates a spreader for particulate material pivotally secured by parallel links 12 and 14 to vertical stanchions 16 and 18 adjacent opposite sides of a conveyor 20 for dispensing and spreading either flaky or particulate material over the upper surface of articles carried by conveyor 20 below spreader 10. Stanchions 16 and 18 are secured to the opposite sides of a hollow frame 22 having a pair of elevating screws 26 and 28 rotatably secured thereto. Elevating screws 26 and 28 have sprockets 26a secured thereto such that rotation of hand wheel 30 on sprocket 26a imparts rotation through chain 31 to rotate elevating screws 26 and 28 in unison.

Elevating screws 26 and 28 threadedly engage connector members 32 on lengths 12 extending between stanchions 16, 18 and a container 40 for particulate material.

In the particular embodiment of the invention illustrated in FIGS. 1 and 2 of the drawing, container 40 comprises a hopper having side walls 42 and 44 converging downwardly toward an inlet passage 45 formed through the wall of a hollow tube 46 having a hollow bore 48 extending therethrough. An outlet passage 50 extends through the wall of dispensing tube 46 and is substantially diametrically opposed to the inlet passage 45. The hopper 40 has end walls 41 and 43 extending between side walls 41 and 42. According to an alternate embodiment, an agitator can also be disposed within hopper 40 to assist in feeding particulate matter toward inlet passage 45.

Links 12 and 14 are arranged to form a parallel linkage such that rotation of hand wheel 30 moves the hopper 40 vertically relative to conveyor 20. Each top length 14 is preferably an extendable member and in the particular embodiment illustrated in FIG. 1 of the drawing is an air cylinder having a piston slidably disposed therein, the rod end of the cylinder being connected to end walls 41 and 43 of the hopper. Thus, when the rod of the cylinder is extended hopper 40 is moved from the full outlying position illustrated in FIG. 1 of the drawing to the position illustrated in dashed outline. As will herein be more fully explained, it is desirable to move the hopper to the position illustrated in dashed outline for removing the mandrel for adjusting the dispensing pattern of the particulate material.

As best illustrated in FIGS. 2 and 3 of the drawing, a mandrel 60 has blocking collars 62 formed at spaced locations along the length thereof and opposite ends of the mandrel are supported by journals 63 and 64 rotatably supported in the bore 48 of dispensing tube 46. Collars 62 also serve as bearings spaced longitudinally of bore 48. Spline teeth 65 are formed on mandrel 60 between blocking collar 62 for forming dispensing sections in bore 48.

A quick release coupling 66 is secured to one end of mandrel 60 and is connectable to a coupling 68 on clutch 70 supported by end wall 43 of hopper 40.

Clutch 70 is preferably an air driven clutch to which pressurized air is supplied through air lines 72 and valves 74 connected to a suitable pressure source. Valve 74 is actuated by a solenoid 75 connected through a switch 76 to a source of electricity. Switch 76 is preferably actuated by a lever 78 which is engaged by compartment 79 of a tray 80 employed for cooking food products.

Clutch 70 is driven by a reversible variable speed direct current electric motor 82 through a chain or belt 84. The speed of motor 82 can be controlled by adjusting potentiometer 85 connected to a suitable source of electricity.

Hopper 40 is provided with a cover 86 having a hinge pin 88 pivotally secured in an opening in wheels 89, rotatably supported on axle 90 secured to wall 42 of hopper 40. As illustrated in FIG. 2 of the drawing, wheel 89 is biased by spring 92 in a counterclockwise direction as viewed in FIG. 2. Cover 86 is provided with a strike plate 94 having an opening formed therein to receive bolt 95 of latch 96 secured to wall 44 of hopper 40. Bolt 95 is spring urged to an extended position and strike plate 94 is shaped to urge bolt 95 inwardly until the bolt is aligned with the opening in strikeplate 94 at which time it will be spring urged outwardly to latch cover 86 in a closed position.

As illustrated in FIG. 2, when cover 86 is closed spring 92 urges wheels 89 in a counterclockwise direction, thereby moving lip 87 on the edge of cover 86 into engagement with the upper edge of wall 44 of hopper 40 when bolt 95 is extended into the opening in strike plate 94. When wheel 89 is rotated in a clockwise direction, spring 92 will be extended and cover 86 will move to the right as illustrated in FIG. 2 of the drawing, thereby moving lip 87 away from the upper edge of wall 44 and moving strike plate 94 out of engagement with bolt 95. After strike plate 94 has been disengaged from bolt 95, cover 86 can be rotated in a counterclockwise direction as illustrated in FIG. 2 about hinge pin 88 to facilitate filling hopper 40 with particulate material. As hereinbefore described and as illustrated in FIG. 2 of the drawing, cover 86 on container 40 is pivotally secured by hinge pins 88 between a pair of wheels 89 which are rotatably secured to opposite ends of axle 90 secured to container 40. Thus, rotation of wheels 89 causes the edge of cover 86 axle 90 to be elevated slightly and will then impart longitudinal movement to cover 86 for disengaging bolt 95 from the aperture in strike plate 94.

When hopper 40 is pivoted to the position illustrated in dashed outline in FIG. 1 of the drawing, it should be readily apparent that latch 96 will maintain cover 86 in a closed position to prevent spilling particulate material therefrom. When hopper 40 is in the position shown in dashed outline in FIG. 1 of the drawing, mandrel 60 may be removed and replaced with another mandrel having a different number of blocking collars 62 formed thereon.

In the embodiment of mandrel 60 illustrated in FIG. 3 of the drawing, four splined segments 65 are formed between blocking collar 62 such that four columns of particulate material will be dispensed simultaneously across conveyor 20. It should be readily apparent that mandrel 60 may be replaced with other mandrels by merely disengaging coupling 66. Additional mandrels may have different numbers of dispensing segments 65 formed thereon to adjust the pattern of particulate material which will be dispensed thereby.

The mandrel 60 has spaced spline teeth 65 formed in spaced splined segments on its outer surface in dispensing sections separated by blocking collars 62 spaced longitudinally of the mandrel such that rotation of the mandrel causes particulate material to be dispensed in parallel columns and such that intermittent rotation of the mandrel causes the columns to be divided to form rows. It should be readily apparent that this intermittent dispensing of materials in the columns causes the particulate material to form a grid-like pattern as is desirable for dispensing seeds onto hamburger buns in pan 80. Spline teeth 65 have a major diameter equal to the diameter of the blocking collars 62 less a distance in a range of from three to four times the diameter of the particles of particulate material to be dispensed such that when the mandrel is rotated inside hollow tube 46 having an inside diameter approximately equal to the outside diameter of the blocking collars, an arcuate annular dispensing passage is formed. The spacing between the inner wall of the tube 46 and the major diameter of the spline teeth is preferably in a range of one and a half to two times the diameter of the particles of material being dispensed to prevent milling or grinding of the particulate material upon rotation of the mandrel.

Referring to FIG. 2 of the drawing, switch 76 will be actuated intermittently to intermittently energize clutch 70. Spacing between the outer edges of spline teeth 65 and the inner wall of dispensing tube 46 is maintained to prevent gravity flow of particulate material through the annular passage between mandrel 60 and the inner wall of dispensing tube 46 but is sufficiently great to prevent grinding or milling of the particulate material. Initial testing of the apparatus indicates that spacing between outer edges of teeth 65 and the inner wall of tube 46 should be at least as great as the diameter of the particulate material being dispensed and preferably in a range between $1\frac{1}{4}$ and 2 times the diameter of individual particles.

Edge 52 of outlet opening 50 formed in tube 46 is preferably positioned such that segment 47 of the wall of dispensing tube 46 extends beyond a vertical plane extending downwardly from the axis 55 of mandrel 60 such that edge 52 of opening 50 is positioned at an elevation above the lower most position on the wall segment 47 to prevent gravity flow of material through the annulus 48a between wall segment 47 and the surface of mandrel 60. Edge 53 of outlet passage 50 adjacent the lower edge of segment 49 of tubular member 46 is at an elevation above the elevation of edge 52 to facilitate dispensing flaky material when mandrel 60 is rotated in a clockwise direction as illustrated in FIG. 2 of the drawing. Flaky material is moved through portion 48b of annulus 48 between wall segment 49 and the outer surface of mandrel 60.

A dispensing chute 68 having a lower edge 69 is secured to the extremity of wall segment 76 of dispensing tube 46 adjacent edge 52 such that granular material moving past edge 52 or flaky material moving past edge 53 will fall on chute 68. Chute 68 is inclined at an angle of approximately 30° relative to a vertical plane extending through edge 52 for causing either granular material or flaky material to tumble such that clumps of material are spread over the surface of the chute before falling off of lower edge 69 of the chute 68. The edge 69 of chute 68 should be vertically above contact 56 of switch 76 such that the particulate material or the flaky material will be dispensed adjacent the leading edge of an article moving adjacent switch 76 and dispensing will be terminated immediately adjacent the trailing edge of the article.

From the foregoing it should be readily apparent that spreader 10 is particularly adapted to dispense either flaky or particulate material. Container 41 has an elongated opening 45 and dispensing tube 46, having a hollow bore formed therein, extends longitudinally of opening 45 to receive either flaky or particulate material from container 41. Inlet passage 62 in tubular member 42 communicates with the inside of container 41 and with the bore and dispensing tube 46. Outlet passage 50 in dispensing tube communicates with the bore in the tube and with the exterior of container 41. All segments 47 and 49 of dispensing tube 46 extend between inlet passage 62 and outlet passage 50, wall segment 47 being longer than wall segment 49. Thus, outlet passage 50 lies entirely on one side of a vertical plane P extending through the center of dispensing tube 46 such that the lower edge 52 of wall segment 47 is positioned at a lower elevation than the lower edge 53 of wall segment 49. Mandrel 60 driven by a reversible variable speed motor is employed for moving granular material through the annular passage 48a or if desired, flaky material through annular passage 48b.

Material dispensed through outlet passage 50 will tumble and roll along the upper surface of dispensing chute 68 to spread the material uniformly over the surface of a food product in pan 80.

Other alterations and modifications of the invention will become apparent to one of ordinary skill in the art upon reading this disclosure in accordance with the accompanying drawings, and it is intended to cover all such alterations and modifications as fall within the scope of the appended claims.

What is claimed is:

1. Apparatus to dispense either flaky or particulate material onto an article comprising: a container having an elongated opening formed therein; a dispensing tube having a hollow bore, said tube extending longitudinally of said opening, said tube having longitudinally extending inlet and outlet passages formed therein, said inlet passage communicating with the inside of the container and with the bore of the tube, said outlet passage communicating with the bore of the tube and the exterior of the container, wall segments on said dispensing tube extending between said inlet and outlet passages, one of said wall segments being longer than the other of said wall segments and said outlet passage lying entirely on one side of a vertical plane extending through the center of said dispensing tube such that the lower edge of one of said wall segments is positioned at a lower elevation than the lower edge of the other wall segment; a mandrel rotatably disposed in said bore; conveyor means on the surface of the mandrel for conveying the material from the container to the outlet of the bore, said conveyor means having a major diameter which is less than the diameter of the bore to form an annular space between the major diameter of the conveyor means on the mandrel and the diameter of the bore which is greater than the maximum dimension of individual particles of material being dispensed to prevent destruction of the particles being dispensed but being spaced sufficiently close together to prevent gravity flow of particles through the annular space when the mandrel is not rotating; drive means drivingly connected to said mandrel; and means associated with said drive means to intermittently energize said drive means when an article to receive particulate material is positioned in a predetermined relationship relative to said tube and to de-energize said drive means when the article is moved away from said predetermined position.

2. Apparatus according to claim 1 with the addition of a dispensing chute adjacent to said outlet passage to spread material dispensed uniformly over a surface.

3. Apparatus according to claim 1 wherein said container comprises a hopper having walls converging toward said inlet opening.

4. Apparatus to dispense either flaky or particulate material comprising: a hopper having an elongated opening formed therein; a cover secured to said hopper; an axle rotatably secured to said hopper; a pair of wheels secured for rotation about opposite ends of said axle; hinge pins secured to said lid and pivotally secured adjacent the outer periphery of said wheels such that rotation of the wheels imparts movement to the cover in a direction generally parallel to the plane of the cover; latch means between said cover and said hopper, said latch means being adapted to release an edge of the cover upon rotation of said wheels; means resiliently urging said wheels to position said cover and said latch means for securing the cover relative to the hopper; a dispensing tube having a hollow bore, said tube extending longitudinally of said opening, said tube having longitudinally extending inlet and outlet passages formed therein, said inlet passage communicating with the inside of the hopper and with the bore of the tube, said outlet passage communicating with the bore of the tube and the exterior of the hopper, wall segments on said tube extending between said inlet and outlet passages, one of said wall segments being longer than the other of said wall segments and said outlet passage lying entirely on one side of a vertical plane extending through the center of said tube such that the lower edge of one of said wall segments is positioned at a lower elevation than the lower edge of the other wall segment; a dispensing chute adjacent to said outlet passage to spread material dispensed uniformly over a surface; walls on said hopper converging toward said inlet opening; a mandrel rotatably disposed in said bore; and reversible drive means drivingly connected to said mandrel.

5. Apparatus to dispense either flaky or particulate material comprising: a contanier having an elongated opening formed therein; a dispensing tube having a hollow bore, said tube extending longitudinally of said opening, said tube having longitudinally extending inlet and outlet passages formed therein, said inlet passage communicating with the inside of the container and with the bore of the tube, said outlet passage communicating with the bore of the tube and the exterior of the container, wall segments on said tube extending between said inlet and outlet passages, one of said wall segments being longer than the other of said wall segments and said outlet passage lying entirely on one side of a vertical plane extending through the center of said tube such that the lower edge of one of said wall segments is positioned at a lower elevation than the lower edge of the other wall segment; a mandrel rotatably disposed in said bore; reversible drive means drivingly connected to said mandrel, said drive means comprising a variable speed motor drivingly connected to a clutch; and sensor means positioned to energize said clutch when an article to receive particulate material is positioned in a predetermined relationship relative to said tube and to disengage said clutch when the article is moved away from said predetermined position.

6. Apparatus to dispense fragile particulate material onto an article carried by a conveyor comprising: a container having an elongated opening formed therein; a dispensing tube having a hollow bore, said tube extending longitudinally of said opening, said tube having longitudinally extending inlet and outlet passages formed therein, said inlet passage communicating with the inside of the container and with the bore of the tube and said outlet passage communicating with the bore of the tube and the exterior of the container; a mandrel rotatably disposed in said bore, said mandrel being formed to divide the bore of the tube into spaced dispensing sections separated by spaced blocking sections; spaced blocking collars on said mandrel, said blocking collars having an outside diameter substantially equal to the diameter of the bore through the tube to prevent passage of particulate material from one dispensing section longitudinally of the tube to an adjacent dispensing section; means on the surface of the mandrel between said blocking collars, said means on the surface having a major diameter which is less than the diameter of the bore, the spacing between the major diameter of the mandrel and the diameter of the bore being greater than the diameter of individual particles of material being dispensed to prevent destruction of the particles being dispensed but being spaced sufficiently close together to prevent gravity flow of particles through the bore when the mandrel is not rotating; a reversible variable speed motor associated with said mandrel and drivingly connected to a clutch; and sensor means positioned to energize said clutch when an article on the conveyor to receive particulate material is positioned in a predetermined relationship relative to said tube and to disengage said clutch when the article on the conveyor is moved away from said predetermined position.

7. Apparatus according to claim 6 with the addition of a dispensing chute adjacent to said outlet passage to spread material dispensed uniformly over a surface.

* * * * *